United States Patent [19]

Oros et al.

[11] Patent Number: 4,986,002

[45] Date of Patent: Jan. 22, 1991

[54] QUICK SETTING ANGLE DEVICE FOR A WELDING TORCH

[75] Inventors: Alvin K. Oros, Farmington Hills; Rudolf P. Noworyta, Dearborn; Fred G. Sawyer, Allen Park, all of Mich.

[73] Assignee: Ford Motor Company, Dearborn, Mich.

[21] Appl. No.: 462,522

[22] Filed: Jan. 9, 1990

[51] Int. Cl.⁵ .............................................. G01C 9/36
[52] U.S. Cl. ........................................ 33/354; 33/390; 33/334
[58] Field of Search ............... 33/354, 390, 21.1, 21.3, 33/22, 334; 266/56, 58, 62, 77, 66, 54; 228/7, 45, 55, 56.5

[56] References Cited

U.S. PATENT DOCUMENTS

| | | | |
|---|---|---|---|
| 1,698,154 | 1/1929 | Day | 33/21.3 |
| 1,931,696 | 10/1933 | Hedenstrom | 266/58 |
| 1,978,042 | 10/1934 | Dodge | 266/58 |
| 2,587,461 | 2/1952 | Gatimel | 266/58 X |
| 3,124,093 | 3/1964 | Wakeley | |
| 3,443,732 | 5/1969 | Wall, Jr. et al. | |
| 3,664,032 | 5/1972 | Tompkins | 33/334 |
| 4,202,535 | 5/1980 | Eriksson | |

Primary Examiner—Harry N. Haroian
Attorney, Agent, or Firm—Joseph W. Malleck; Roger L. May

[57] ABSTRACT

A torch angle measuring device, comprising: (a) a support rigidly clampable to the nozzle of the torch; (b) a reference member; (c) joint means between the reference member and the support providing axes of rotational movement therebetween, the axes being at 90° to each other and each being transverse by 90° to the nozzle axis; and (d) plumb level means on the reference member for displaying levelness in planes parallel to the joint means axes. The joint means has the first of the axes effective to determine lead angle and the second of said axes effective to determine transverse angle. The device additionally includes means for holding the device in an adjusted angle position.

1 Claim, 5 Drawing Sheets

QUICK SETTING ANGLE DEVICE FOR A WELDING TORCH

BACKGROUND OF THE INVENTION

1. Technical Field

This invention relates to the art of accurately setting an arc welding torch in a mechanically fixed orientation to a relatively moving workpiece during welding to enhance the quality of the weld.

2. Discussion of the Prior Art

Arc welding torches can be straight, angled or curved, and the degree of straightness, angle or curvature can vary between manufacturers. Nonetheless, the axis of the gas nozzle for such torches is coincidental with the axis of the welding electrode wire (which is in coincident with the torch contact tip). It is the orientation between (a) the line of movement for weld travel, and (ii) the axis of the electrode wire passing through the weld bead that determines the weld angle. Weld angle is compound, comprising: (a) an inclination between such electrode axis and the line of movement in a plane that is at 90° either to the axis of rotation if the workpiece is rotating relatively or to the first general plane of the workpiece if stationary (often called lead angle), and (b) an inclination between such electrode axis and the line of movement in a plane parallel to the axis of rotation if the workpiece is rotating relatively or to a second general plane at 90° of the first plane if the workpiece is stationary (often called transverse angle).

Torch angle is a critical parameter in welding; in many cases it is second in importance only to welding current. Applicants are unaware of any prior art that is effective in measuring or setting torch angle independent of the workpiece as part of the fixturing. It is common practice to estimate the initial torch angle based upon experience and data, and then modify the angle using protractors by a trial and error technique to arrive at the optimum angle for welding quality in a production run. Attempts to fixture the measurement have consistently resulted in use of devices, often very complex, that contact the workpiece to be welded to establish references (see U.S. Pat. Nos. 3,124,093; 3,443,732; and 4,202,535). This latter approach is disadvantageous because it is cumbersome in automatic robotic applications which are frequently changing and the torch is held independent of the workpiece.

What is needed is a device that not only eliminates estimation, but accurately, quickly, and universally establishes torch angle in three-dimensional space independent of the workpiece, and does so with ease and without complexity.

SUMMARY OF THE INVENTION

The invention is a torch angle measuring device for a welding torch, comprising: (a) a support rigidly clampable to the nozzle of the torch; (b) a reference member; (c) joint means between the reference member and the support providing axes of rotational movement therebetween, the axes being at 90° to each other and each being transverse by 90° to the nozzle axis; and (d) plumb level means on the reference member for displaying levelness in planes parallel to the joint means axes.

Preferably, the joint means has the first of the axes effective to determine lead angle and the second of said axes effective to determine transverse angle.

Preferably, the device additionally includes means for holding the device in an adjusted angle position. The plumb level means may advantageously comprise a 360° level or may be subdivided into separate levels for determining levelness about the different axes of said joint means.

Advantageously, the reference member is shaped to have a cylindrical configuration rotatable about its own central axis and to which is attached a yoke at one end for the joint means.

Alternatively, the support may have attached thereto a cam along which the torch is moved during welding by contact with a complementary guide.

DETAILED DESCRIPTION AND BEST MODE

Figure 1:
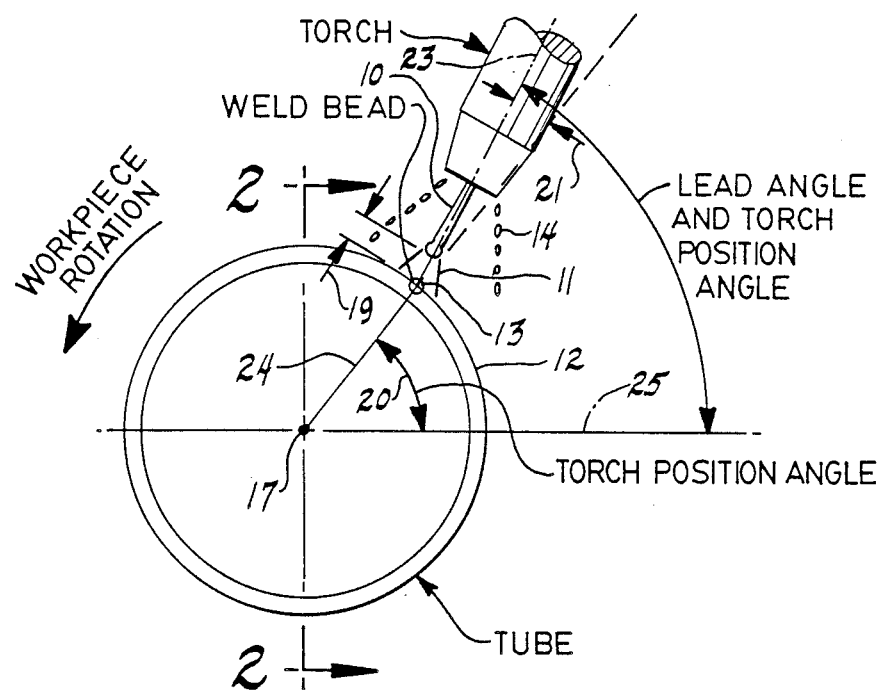
FIG. 1 is a schematic elevational view, looking along the axis of the workpiece, illustrating the lead angle for a torch.
Figure 1:
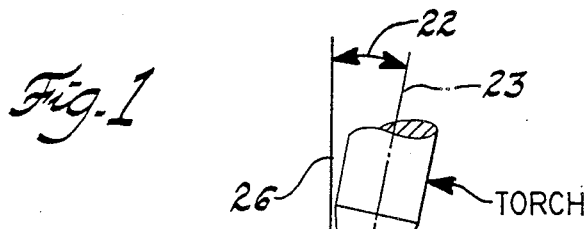

In consumable electrode arc welding processes, an electrode 10 of indefinite length is continuously fed to a welding arc 11, established between the electrode 10 and a workpiece 12, where it is melted by the intense heat of the arc and fuses with the workpiece. Generally, the metal 13 deposited from the consumable electrode is shielded with an inert shielding gas 14, and thus the reference to the process as gas metal arc welding. Consumable electrode welding is not only substantially faster than nonconsumable electrode welding, but is particularly adapted to automatic welding of carbon, stainless steel, and aluminum where it has been predominantly used. The shielding gas provides a more easily ionized path than obtained in air, aiding smooth transfer of current functioning to surround the arc in a weld pool with an atmosphere that is nonreactive with the molten metal.

To illustrate how the measuring device of this invention works with an arc welding torch, the workpiece 12 comprises a pair of cylindrical end portions of a tube 15 and a tube yoke 16 which are nested together in an axial direction, such as by use of an interfitting stepped joint 18 or interference fit. The tubes are torque members used in forming a driveshaft for an automobile. The nested tubes are rotated about an axis 17 at a relatively high speed to improve the productivity of the welding process. While the tubes are being rotated, the arc 11 is established between the consumable metal electrode 10 and the joint 18; as the workpiece rotates, the weld is advanced around the circumference of the tubes. The electrode is fed along the axis of the welding torch during the welding operation to maintain a desired spacing 19 of electrode tip from the weld profile as the tip is being consumed.

Angle orientation of the welding electrode 10 with respect to the weld bead 13 is extremely important and are influential factors in controlling penetration and fusion. Angle orientation is made up of a torch position angle 20, a lead angle 21, and a transverse angle 22. These angles will now be described.

It is often desirable to carry out welding such as the torque tubes herein, with the torque tube axis 17 in a horizontal position. This gives added importance to the parameters of torch position and torch angle. Torch position, as shown in FIG. 1, is the angle between the axis 23 of the torch electrode coincident with a radius 24 of weld movement passing through the weld bead 13 and a horizontal plane 25. As the torch position increases from vertical to horizontal, the effect of welding current on penetration will decrease significantly. Often, when the torch position is set at 60°, the maximum allowable penetration for the weld can no longer be achieved, even at the highest current settings. The torch position angle of 54° is that shown in FIG. 1, where the current curve will most closely simulate the average current/penetration relationship.

Torch lead angle is the angle formed between an extension of the radius 24 and the electrode axis 23 when it is not coincident with the radius 24; the electrode axis must always be aimed to pass through the weld bead in its new position. The torch lead angle is important because it aids in controlling the formation shape of the weld bead. The torch thus will be inclined from a perpendicular to a tangent at the point of welding, as shown in FIG. 1. The torch will be inclined in the direction of rotation to provide a leading torch angle; that is, the arc is pointed in the direction of unwelded base metal as the weld progresses. Desirable torch lead angles for purposes of welding aluminum often is in a range of about 10° accompanied by a position angle of about 51° and about a 12° angle for the transverse angle.

Figure 2:
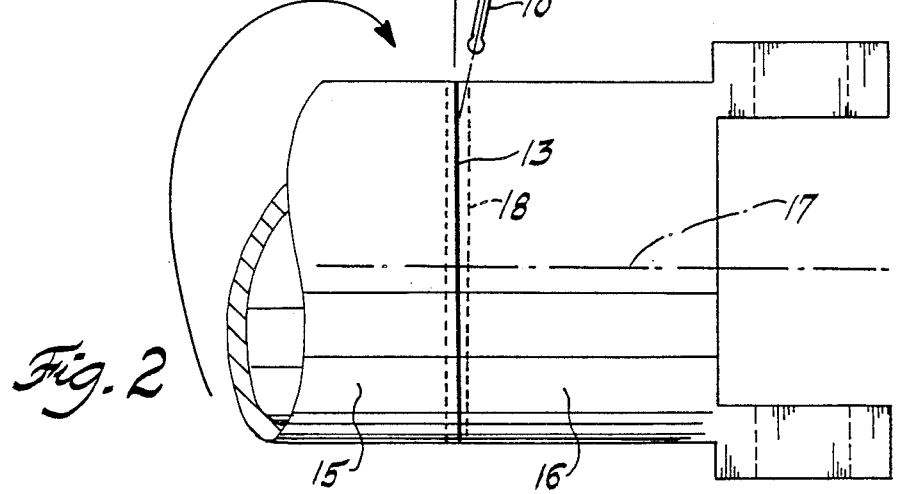
FIG. 2 is a view taken at right angles to that of FIG. 1, along line 2—2 in FIG. 1, illustrating the transverse angle of an arc welding torch.

Transverse angle (as shown in FIG. 2) is that inclination between a plane 26 perpendicular to the axis 17 of rotation of the workpiece and the axis 23 of the electrode. Such transverse angle can be to either side of the transverse plane.

Figure 3:
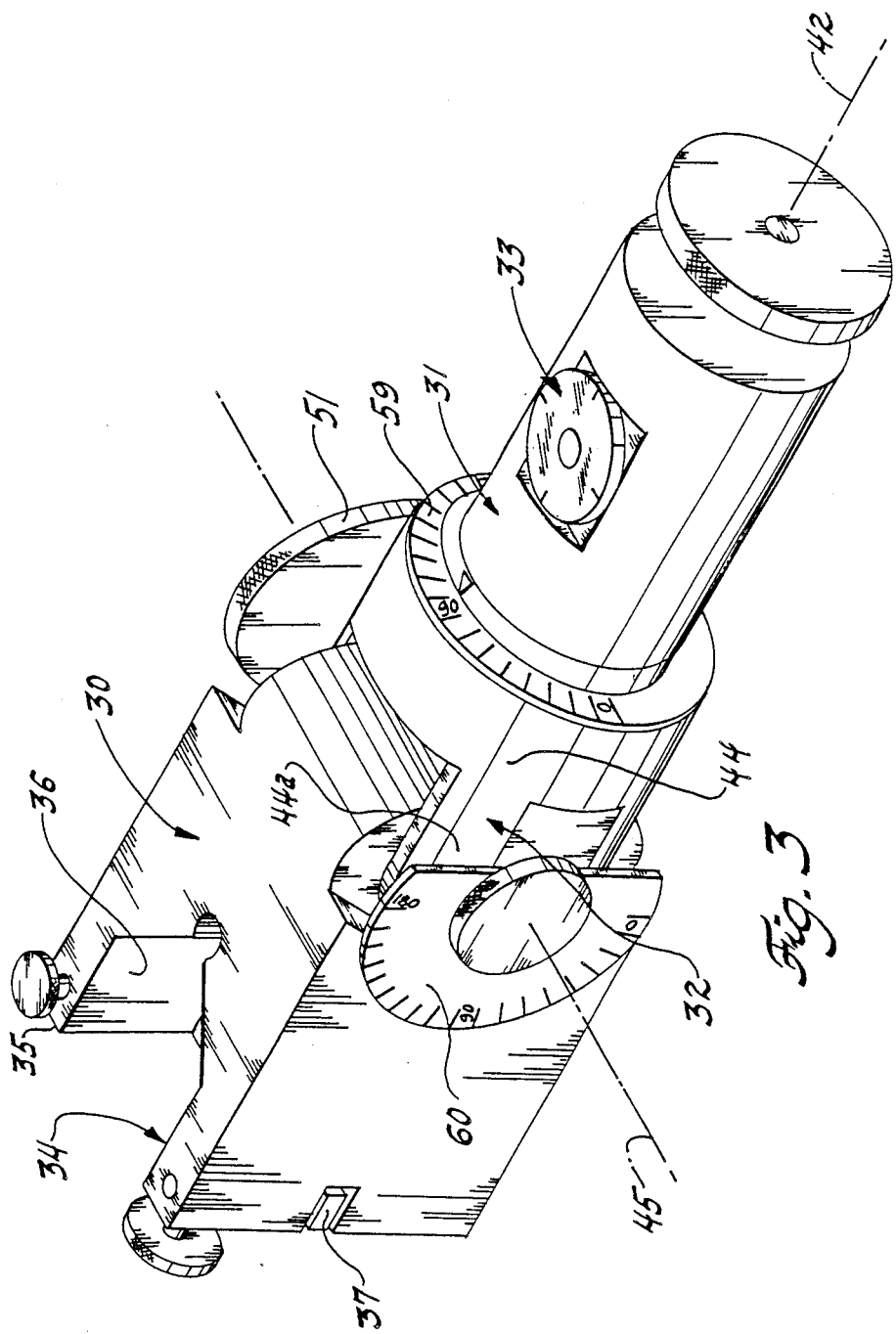
FIG. 3 is an enlarged perspective view of the torch angle measuring device of this invention which is attachable to the torch of FIGS. 1 and 2.
Figure 4:
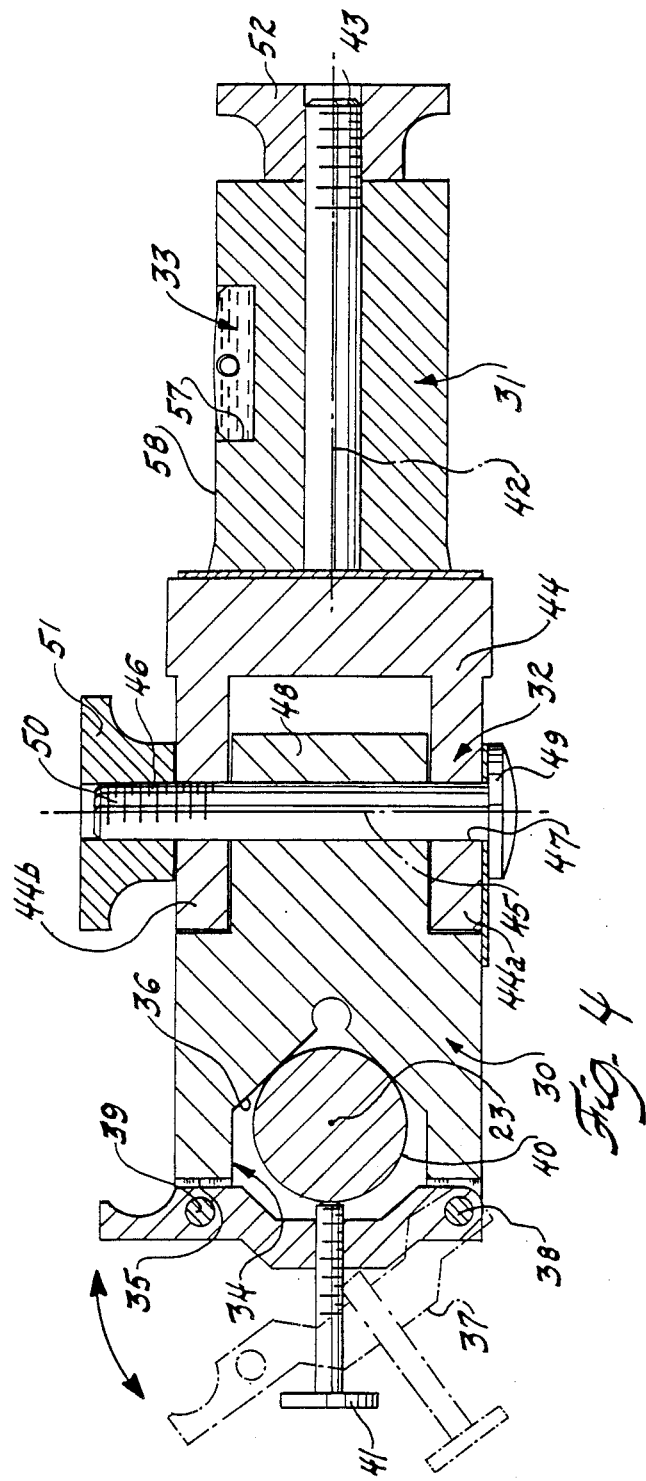
FIG. 4, is a cross-sectional view of the device in FIG. 3.

As shown in FIGS. 3-4, the torch angle measuring device of this invention comprises essentially a support 30, a reference member 31, a joint means 32, and a plumb level means 33. The support is formed from a block of metal within which a slot 34 is formed at one side 35 with the bottom of the slot having tapered end walls 36. A clasp 37 is hinged at one side 38 and is adapted to extend across the open end of the slot to be locked in position by a lock pin 39. The slot is sized to receive the torch nozzle 40 thereinto with its axis 23 parallel to the longitudinal extent of the slot 34. When so inserted, with the clasp locked into position about the nozzle, a threaded fastener 41 may be moved through the clasp to clamp the nozzle tightly against the tapered end walls and be fixed in position relative to the support.

The reference member 31 can be a simple cylinder within which one of the axes 42 of the joint means can be readily contained. The cylinder is rotatable about a pin 43 (defining axis 42) and has a yoke 44 at its inner end which cooperates with the other axis 45.

The joint means 32 makes a has universal joint members between the reference member 31 and the support 30 by use of the axes 45, 42 of movement therebetween. The first axis 45 is defined by pin 46 oriented at 90° to the axis 23 of the nozzle. Such pin is rotatably supported in a complementary-sized cylindrical opening 47 through the end 48 of the support; one end of the pin has a head 49 and the other end 50 is threaded to receive a fastener 51 to lock the pin in position when a desired angular orientation is achieved.

The yoke 44 extends from one end of the reference member with arms 44a and 44b of the yoke being spaced apart along a line transverse to the nozzle and sufficient to receive the end 48 of the support. The second axis 42 extends centrally through the reference member in a position that would intersect with the axis 23 of the nozzle, but perpendicular thereto and at right angles to the first axis 45. Pin 43 may be integrally carried by end 48 of the support. A threaded fastener 52 may be secured about the threaded end of the pin 43 for clamping the reference member in position about the second axis pin when in a desired angle.

The plumb level means 33 is a full 360° type level mounted in a recess 57 within the upwardly facing side 58 of the reference member. Dials 59 and 60 may be mounted on the outside of the device around each of the axes 42, 45 respectively to give a visual indication of the angular orientation. Zero angle for the lead angle is shown when the reference member axis is perpendicular to the torch axis and the torch axis is vertical. The starting angle for the transverse angle dial is 90° (as shown in FIG. 3) when the pin 43 is 90° to the axis of the nozzle.

Figure 5:
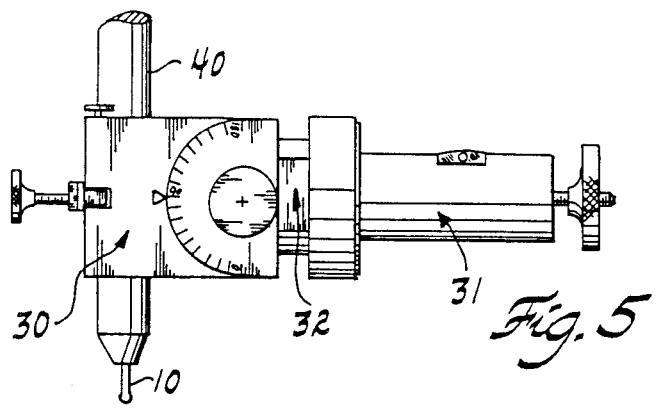
FIGS. 5–7 illustrate how the torch angle measuring device, when attached to the torch nozzle, is utilized to establish lead angle.
Figure 6:
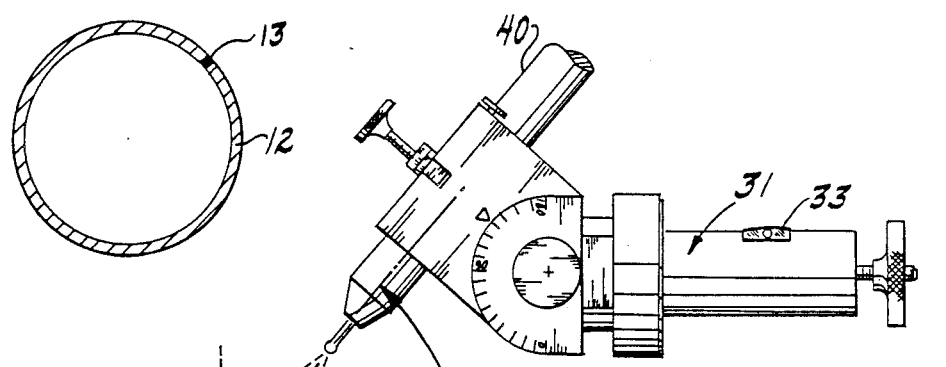

To set the position angle 20, the torch is moved from a vertical position, as shown in FIG. 5, to a position angle of about 51°, as shown in FIG. 6 with the reference member held in a level position by plumb level 33. The exact reading on the dial will be 129° (180° minus 51°). Note that the reference member is in a horizontal position.

Figure 7:
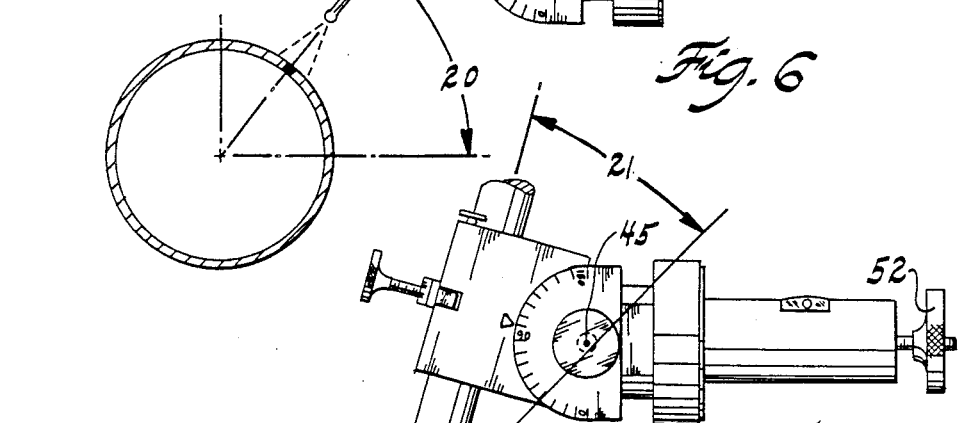

To achieve a lead angle 21 of about 10°, the nozzle is rotated out of alignment with the radius 24, but still having its electrode axis 23 passing through the weld bead 13 (as shown in FIG. 7). The angle then indicated on the dial will be 119°, indicating a lead angle of 10°. In this position, the thumb fastener 51 may be tightened about axis 45 to lock the lead angle of the measuring device.

Figure 8:
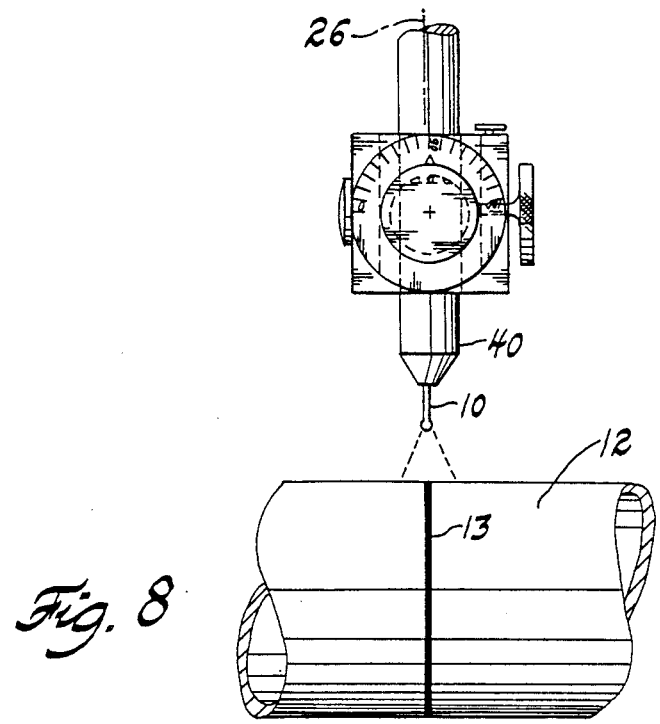
FIGS. 8–9 are views similar to FIGS. 5–7 illustrating how the transverse angle is established utilizing such measuring device.
Figure 9:
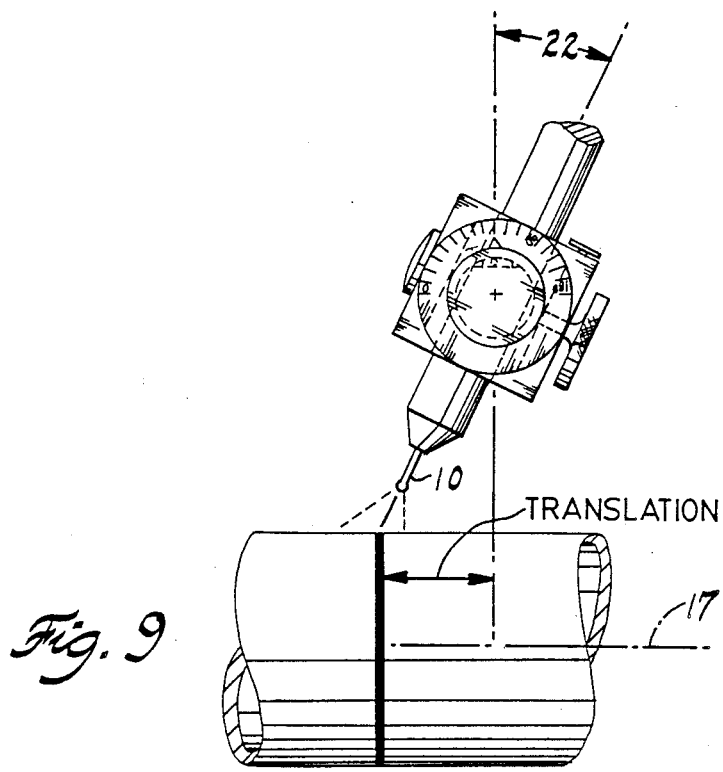

To set the transverse angle 22, the nozzle is moved from a zero angle with respect to the plane 26 perpendicular to the torque tube or workpiece axis (as shown in FIG. 8) to a desired angular position such as 30°, as shown in FIG. 9. To gauge this, the dial is moved from 90° to 60° while maintaining the reference member with its plumb level again in a level condition. In this rotated position, the electrode wire 10 will have its axis not pointing toward the weld bead and therefore the entire torch must be translated in a direction along the axis of the workpiece so that it again passes through the weld bead.

The torch angle measuring device of this invention establishes the position of the welding torch in three-dimensional space independent of the workpiece. Such positioning and space is required in automatic welding operations where torch position has a significant influence on weld quality. This position is accurately established for single or between multiple welding stations. Thus, in automotive welding operations, the relationship between the weld joint and the torch path will be established without hard fixturing. All that is needed is to rotate the workpiece beneath the oriented welding torch. If the workpiece joint is more complex, other than a simple circular shape, such as may be the case in an automotive frame member for the vehicle, a cam may be made in the image of the joint and the torch made to ride on the cam. In any case, it is essential that the initial position of the welding torch in space be accurately established by use of this device.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. A torch angle measuring device for a welding torch having a nozzle with a nozzle axis and within which is carried an electrode wire coincident with the nozzle axis, comprising:

(a) a support rigidly clampable to said nozzle;
(b) a reference member;
(c) joint means between said reference member and support providing axes of rotational movement therebetween, said axes being at 90° to each other and each being transverse by 90° to the nozzle axis, and plumb level means on said reference member for displaying levelness in planes parallel to said joint means axes, said joint means comprising a first pin axis supported on said support and a yoke rotatably supported on the ends of said pin axis, a second pin axis extending integrally outwardly from said yoke upon which is rotatably mounted said reference member.

* * * * *